United States Patent
O'Neil et al.

(10) Patent No.: US 7,711,366 B1
(45) Date of Patent: May 4, 2010

(54) SEAMLESS ENTERPRISE AND CONSUMER MOBILITY

(75) Inventors: Douglas O'Neil, Marietta, GA (US); John Alson Hicks, III, Roswell, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 767 days.

(21) Appl. No.: 11/457,541

(22) Filed: Jul. 14, 2006

(51) Int. Cl.
*H04Q 7/20* (2006.01)
(52) U.S. Cl. .................. 455/438; 455/436; 455/437; 370/331
(58) Field of Classification Search .............. 455/436, 455/437, 438; 370/331
See application file for complete search history.

(56) References Cited

U.S. PATENT DOCUMENTS

| | | | |
|---|---|---|---|
| 5,926,755 A | 7/1999 | Ghisler | |
| 6,233,465 B1 | 5/2001 | Smith et al. | |
| 6,957,077 B2 | 10/2005 | Dehlin | |
| 2002/0178163 A1 | 11/2002 | Mayer | |
| 2003/0114158 A1* | 6/2003 | Soderbacka et al. | 455/436 |
| 2004/0196810 A1 | 10/2004 | Kil et al. | |
| 2005/0021713 A1 | 1/2005 | Dugan et al. | |
| 2005/0079816 A1 | 4/2005 | Karabinis et al. | |
| 2005/0120198 A1 | 6/2005 | Bajko et al. | |
| 2005/0239498 A1 | 10/2005 | Dorenbosch et al. | |
| 2006/0079236 A1 | 4/2006 | Del Pino et al. | |
| 2006/0111112 A1 | 5/2006 | Maveddat | |
| 2006/0116127 A1 | 6/2006 | Wilhoite et al. | |
| 2006/0159047 A1* | 7/2006 | Olvera-Hernandez et al. | 370/331 |
| 2006/0166699 A1* | 7/2006 | Aghvami et al. | 455/552.1 |
| 2006/0258356 A1* | 11/2006 | Maxwell et al. | 455/436 |

* cited by examiner

*Primary Examiner*—Danh C Le
(74) *Attorney, Agent, or Firm*—Parks IP Law LLC; Jonathan A. Paulis

(57) ABSTRACT

Tools and techniques for providing seamless enterprise and consumer mobility are described. More particularly, the tools manage network connections between a communications device and two or more networks. A first network has a first type, and a second network has a second type different type than the first network. When the communications device is proximate the first network, a first device detection signal is generated. Also, a first presence signal is associated with the first network, and varies in response to a condition of a connection between the communications device and the first network. The first presence signal indicates whether the condition of the connection permits an ongoing communication to use the first network. When the condition of the connection does not permit the ongoing communication to continue using the first network, the communication is handed over to the second network.

19 Claims, 11 Drawing Sheets

SEAMLESS ENTERPRISE AND CONSUMER MOBILITY

CROSS-REFERENCE TO RELATED APPLICATION

The instant application is related to commonly assigned co-pending U.S. patent application Ser. No. 11/275,783, entitled "Seamless Wireless Mobility", by Douglas O'Neil and John Alson Hicks III, and incorporated herein by reference for all that it teaches and discloses.

TECHNICAL FIELD

The subject matter relates generally to seamless enterprise and mobility, and more specifically, to systems and methods for integrating telecommunications across various networks.

BACKGROUND

Traditionally, nearly every household and business employed a landline telephone system as a form of communication. However, wireless communication has grown in popularity, such that approximately seventy percent of the households in the United States have a cellular phone or a mobile communication device, while some households no longer employ a landline. Usage of cellular phones or communication devices has also grown in businesses, but landlines are still commonly employed in office environments because they may be less expensive to use.

Having a cellular phone or mobile communication device as the only form of communication poses several unique problems. One problem is that coverage is typically provided over a limited pre-selected service area. As a consequence, there may be no service available outside of the pre-selected service area. If service is available when one travels outside the pre-selected service area, it may be very expensive.

Another problem relates to network operating efficiency in different physical environments. For example, electromagnetic signals may be unable to penetrate fully through the walls of buildings. If users of cellular phones or other mobile communication devices bring their devices inside such buildings, their devices may be unable to operate, and the quality of their services may deteriorate or terminate altogether. As a result, users are inconvenienced when traveling, working at home or inside buildings, or at other remote locations.

With the penetration of wireless communication, communications services represent the fastest growing segment of the telecommunications industry worldwide. Prior to wireless communications services, communications services were primarily offered through landline providers. In particular, the landline providers offered services that were targeted toward "business" users of their network. These business users employed communications services provided by the landline networks, which were primarily available only at the office. In addition, as business users of cellular phones moved from a central office site, to remote office locations, and to home locations, maintaining consistent, high-quality access to these services in these different physical environments may become problematic.

SUMMARY

Tools and techniques for providing seamless enterprise and consumer mobility are described. More particularly, the tools manage network connections between a communications device and two or more networks. A first network has a first type, and a second network has a second type different type than the first network. When the communications device is proximate the first network, a first device detection signal is generated. Also, a first presence signal is associated with the first network, and varies in response to a condition of a connection between the communications device and the first network. The first presence signal indicates whether the condition of the connection permits an ongoing communication to use the first network. When the condition of the connection does not permit the ongoing communication to continue using the first network, the communication is handed over to the second network.

Other systems, methods, and/or computer program products according to embodiments will be or become apparent to one with skill in the art upon review of the following drawings and detailed description. It is intended that all such additional systems, methods, and/or computer program products be included within the scope of this description and the accompanying claims.

BRIEF DESCRIPTION OF THE DRAWINGS

The detailed description is set forth with reference to the accompanying figures. The teachings herein are described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Various exemplary operating environments, systems, and related methods provide for seamless enterprise and consumer mobility across networks of different types. These exemplary operating environments, systems, and methods enable a communication device to interact with a variety of network modules to access telecommunication services using networks having different types.

Figure 1:
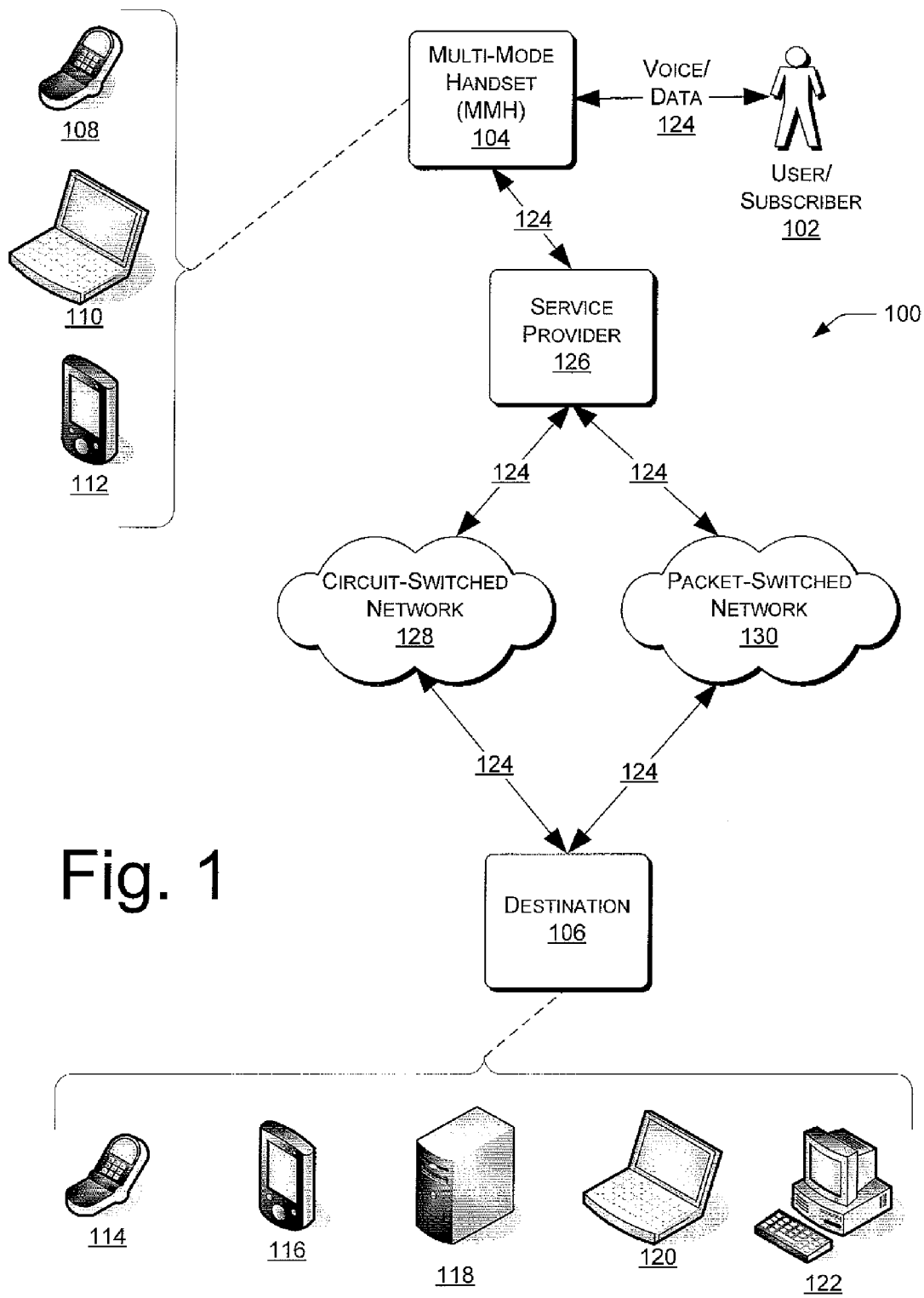
FIG. 1 is a block diagram of an exemplary operating environment for providing seamless enterprise and consumer mobility.

FIG. 1 illustrates an exemplary operating environment 100 for providing seamless enterprise and consumer mobility. A user or a subscriber (referred to also as a "consumer") 102 utilizes a mobile communications device 104 to communicate with a destination 106. As shown in FIG. 1, the communication device 104 may include a mobile telephone 108, a laptop computer 110, a wireless-enabled personal digital assistant (PDA) 112, or other similar mobile devices. The mobile device 104 may have a multi-mode capability, and thus may take the form of a multi-mode handset (MMH).

The destination 106 may take several forms, in different implementations of the operating environment 100. For example, the destination may include a mobile handset 114 and/or a wireless PDA 116 used by another person with whom the user is conversing. The destination may also include a server 118 that may provides voice mail, electronic mail, or other services at least to the user 102. The destination may include a laptop computer 120 or a desktop computer 122, which may be associated with the user 102 or with other persons. For example, the user may access the server, the laptop, or the desktop to access his or her voice mails or e-mails while away from the home or office. Additionally, the user may access the laptop or desktop in order to reach another person using the laptop or desktop.

In one possible implementation, the other user at the destination 106 may be utilizing services and equipment that is located on-premises at the destination. In another possible implementation, the other user at the destination 106 may be utilizing services and equipment that is located on the premises of an entity that provides telecommunication services to the destination 106, in an outsourcing arrangement.

As shown in FIG. 1, the user and the destination may exchange either voice or data, as represented generally by the lines 124 flowing between the user and the destination. The voice/data flow 124 may be either unidirectional or bidirectional in nature.

The user 102 may subscribe to telecommunications services offered by a service provider 126. The service provider may, in some but not necessarily all instances, provide the mobile device 104. In turn, the service provider may enable the user to access a circuit-switched network 128 and/or a packet-switched network 130. However, the service provider need not own or maintain the circuit-switched network 128 and/or the packet-switched network 130 in all instances. Instead, a given service provider 126 may enable the user to "roam" while using networks provided and maintained by other service providers.

The terms "user", "subscriber", and "consumer" may be used interchangeably to describe a person or an entity using the mobile device 104 and/or a person or an entity subscribing to a consumer telecommunication service offered by the service provider 126. Other terms are also used interchangeably with user and subscriber, such as "customer" or "account holder".

The mobile device 104 is described as a "multi-mode" handset to indicate that the mobile device may operate with a plurality of different types of communications networks. For example, the handset 104 may communicate with both the circuit-switched networks 128 and the packet-switched networks 130. Additionally, as described in more detail below, the mobile device may cooperate with the components and modules described below to handover an ongoing call between these two different types of networks, i.e., the circuit-switched networks 128 and the packet-switched networks 130.

Having described an overall operating environment 100, the discussion now turns to a description of a process for handing over an ongoing call between two different types of networks, now presented with FIGS. 2-4 below.

Figure 2:
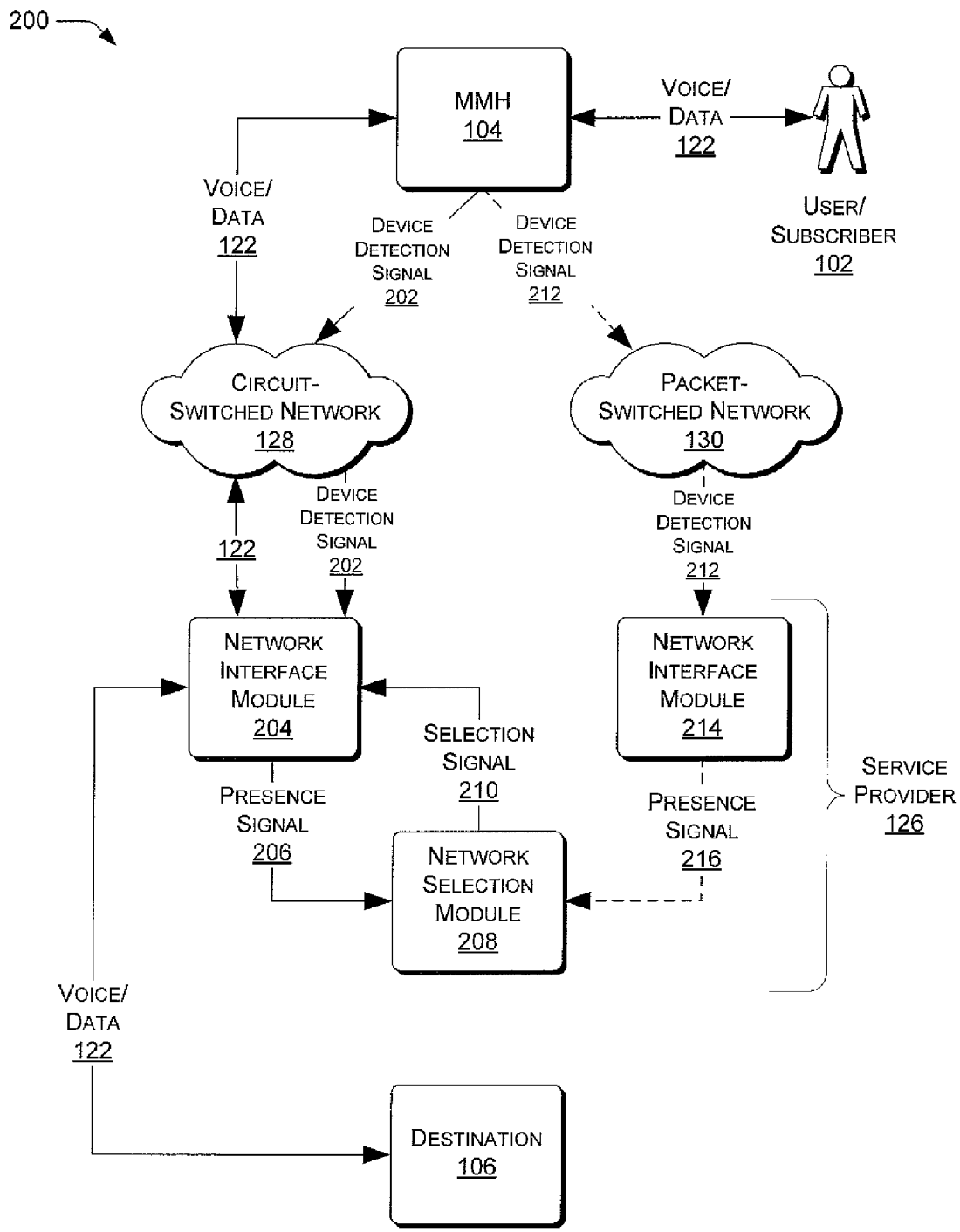
FIG. 2 is a block diagram of an operating environment in which a user communicates with a destination using a circuit switched network.

FIG. 2 illustrates an operating environment 200 in which the user 102 communicates with the destination 106 using the circuit switched network 128. The same reference signs denote elements that are carried forward from FIG. 1.

As shown in FIG. 2, the user communicates using the MMH 104, to exchange voice/data 122 with the destination 106. It is assumed in FIG. 2 that the MMH 104 is initially within range of, and able to communicate using, the circuit-switched network 128. Accordingly, once the circuit-switched network may detect the MMH when the MMH is in proximity to the circuit-switched network, as represented generally by device detection signal 202.

A network interface module 204 may receive the device detection signal 202. The service provider 126 may provide the network interface module 204. The network interface module converts the voice/data signals 122 as appropriate for transmission between the circuit-switched network 128 and the destination 106. It is noted that other networks may be located intermediate the circuit-switched network 128 and the destination 106. In such cases, the network interface module may convert the signals 122 as appropriate for transmission to and/or from any such intermediate networks. In other instances, the network interface module may convert the signals as appropriate for transmission to and/or from the destination 106. Assuming that the circuit-switched network may take a variety of different forms or types, the network interface module may be compatible with these different forms or types. Alternatively, a different network interface module may be provided for each of these different forms or types.

The network interface module may also analyze the condition of the device detection signal 202 to determine the strength and/or quality thereof. The network interface module may generate a presence signal 206 that may vary in response to the strength and/or quality of the device detection signal 202. For example, if the user 102 is relatively close to a cellular transmission tower, or other infrastructure associated with the circuit-switched network, then the network interface module may generate a presence signal having a first value that indicates that the connection to the user is strong. However, if the user moves farther away from the cellular tower, or moves to a physical environment that impedes signals associated with the circuit-switched network, then the network interface module may generate a presence signal indicating that the connection to the user is weak. If connection between the user and the circuit-switched network is lost altogether, the presence signal may assume a null value.

A network selection module 208 may receive and analyze the presence signal 206. More specifically, the network selection module may determine whether the strength and/or quality of the connection with the user, as reflected by the presence signal, is sufficient to permit continued communications with the user via the circuit-switched network. The network selection module may, for example, establish and/or apply one or more thresholds to determine whether communications via the circuit-switched network are possible.

If the presence signal satisfies the above thresholds, then the network selection module 208 may assert a selection signal 210. The selection signal 210 activates the network interface module 204 so that the voice/data 122 passed between the user and the destination via the circuit-switched network 128, rather than the packet-switched network 130. For convenience only, FIG. 2 shows the voice/data 122 passing through the network interface module. However, it is noted that in different implementations, the voice/data 122 may or may not pass through the network interface module.

In FIG. 2, it is assumed that the user may, at least initially, communicate through the circuit-switched network 128, rather than the packet-switched network 130. Turning to the packet-switched network 130, a device detection signal 212 may indicate when the user 102 is proximate to the packet-switched network. FIG. 2 shows the device detection signal 212 in dashed outline to indicate that the user is not proximate to the packet-switched network, and cannot at the moment communicate therewith or therethrough.

The service provider may also provide a network interface module 214 that is associated with the packet-switched network. The network interface module 214 may function similarly to the network interface module 204, except that the former receives and analyzes the device detection signal 212, and produces a presence signal that indicates a strength and/or quality of any connection between the user and the packet-switched network. In the operating environment 200, it is assumed that the user is not proximate to the packet-switched network. Accordingly, the presence signal 216 is shown in dashed outline to convey, for example, a null value.

The network interface modules 204 and 214 and the network selection module 208 may be implemented as software in any appropriate computing or scripting language. As such, the network interface modules and the network selection module may be stored in computer-readable media and loaded therefrom for execution by a general-purpose, computer-based processing system.

Figure 3:
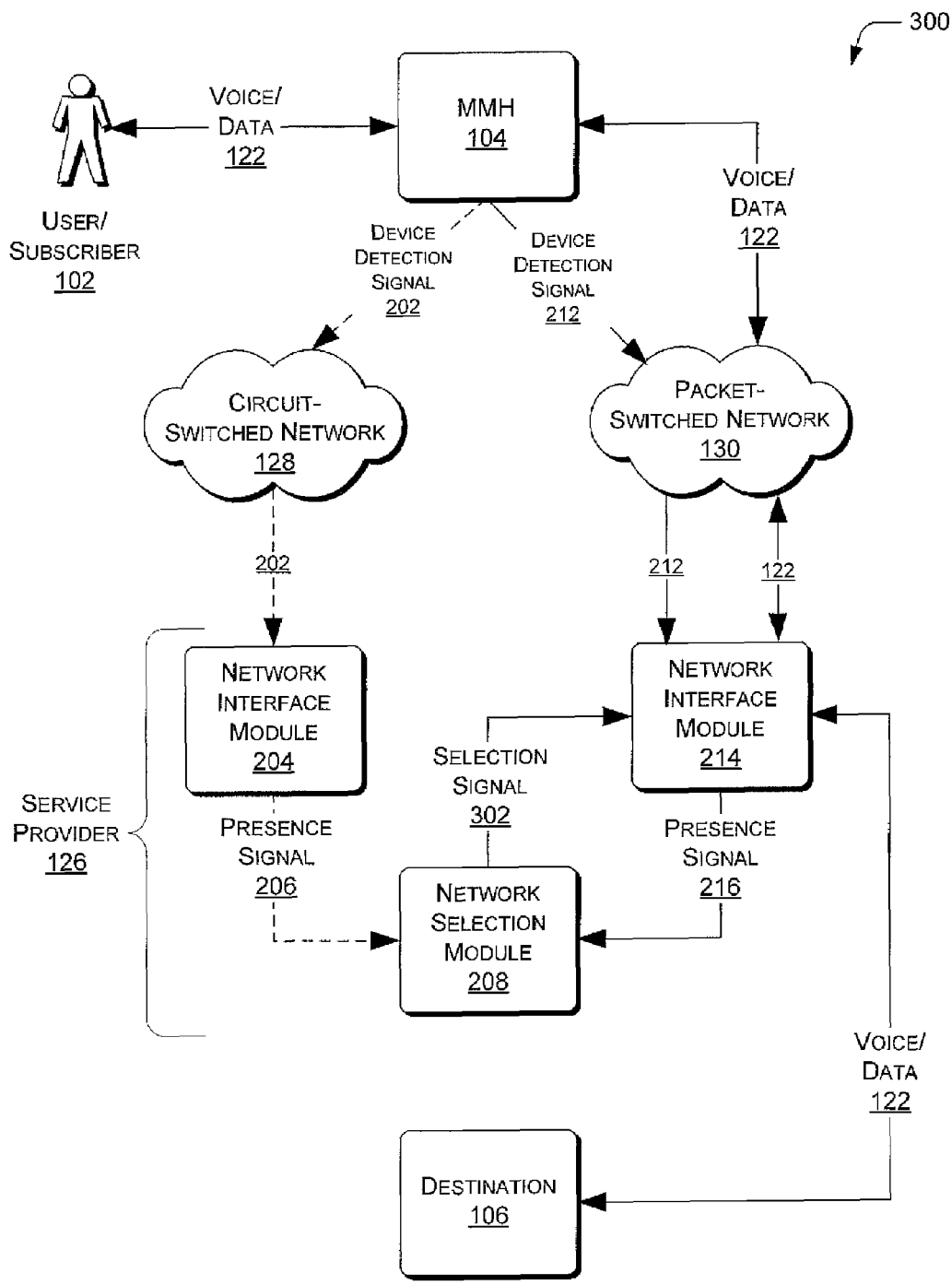
FIG. 3 is a block diagram of an operating environment in which the user communicates through a packet-switched network, rather than the circuit-switched network.

Having described the operating environment 200 in which the user is connected to the circuit-switched network 128, the discussion now turns to a description of a scenario in which the user is connected to the packet-switched network, now presented with FIG. 3.

FIG. 3 illustrates an operating environment 300 in which the user 102 is connected to communicate through the packet-switched network 130, rather than the circuit-switched network 128. As shown in FIG. 3, the device detection signal 212 takes an active state to indicate that the user is connected to the packet-switched network. Accordingly, the voice/data 122 and the pass through the packet-switched network to the network interface module 214.

The network interface module 214 analyzes the condition of the device detection signal 212 to assess the strength and/or quality of the connection between the packet-switched network and the user. The network interface module may also generate the presence signal 216, which in turn may vary in response to the condition of the connection with the user, as reflected in the device detection signal. FIG. 3 shows the presence signal 216 (associated with the packet-switched network) in an active state, and shows device detection signal 202 and the presence signal 206 (associated with the circuit-switched network) in dashed outline to convey an inactive state.

The network selection module 208 may receive the presence signal 216, and may apply one or more thresholds to the presence signal to assess whether the condition of the connection between the user and the packet-switched network permits continued communications via the packet-switched network. Generally, the above description of the presence signal 206 applies equally to the presence signal 216. As the connection improves or decreases in quality, the presence signal 216 may vary accordingly. If the connection drops out altogether, the presence signal 216 may assume a null value.

The network selection module 208 may assert a selection signal 302 that selects the packet-switched network for transporting the voice/data 122 between the device 104 and the destination 106. The selection signal 302 is similar to the selection signal 210 shown in FIG. 2, except that the selection signal 302 activates the packet-switched network rather than the circuit-switched network.

Having described the operating environments 200 and 300 in connection with FIGS. 2 and 3, the discussion now turns to a description of a process flow for handing over ongoing communications involving the device 104 between networks of different types. These different types of networks may include, for example, an instance of the circuit-switched network 128 and an instance of the packet-switched network 130, as illustrated in FIGS. 1-3. However, it is noted that these different types of networks may also include different types of circuit-switched networks, or different types of packet-switched networks. The implementations shown in FIGS. 1-3 are presented only for convenience of discussion, and not for limitation.

Figure 4:
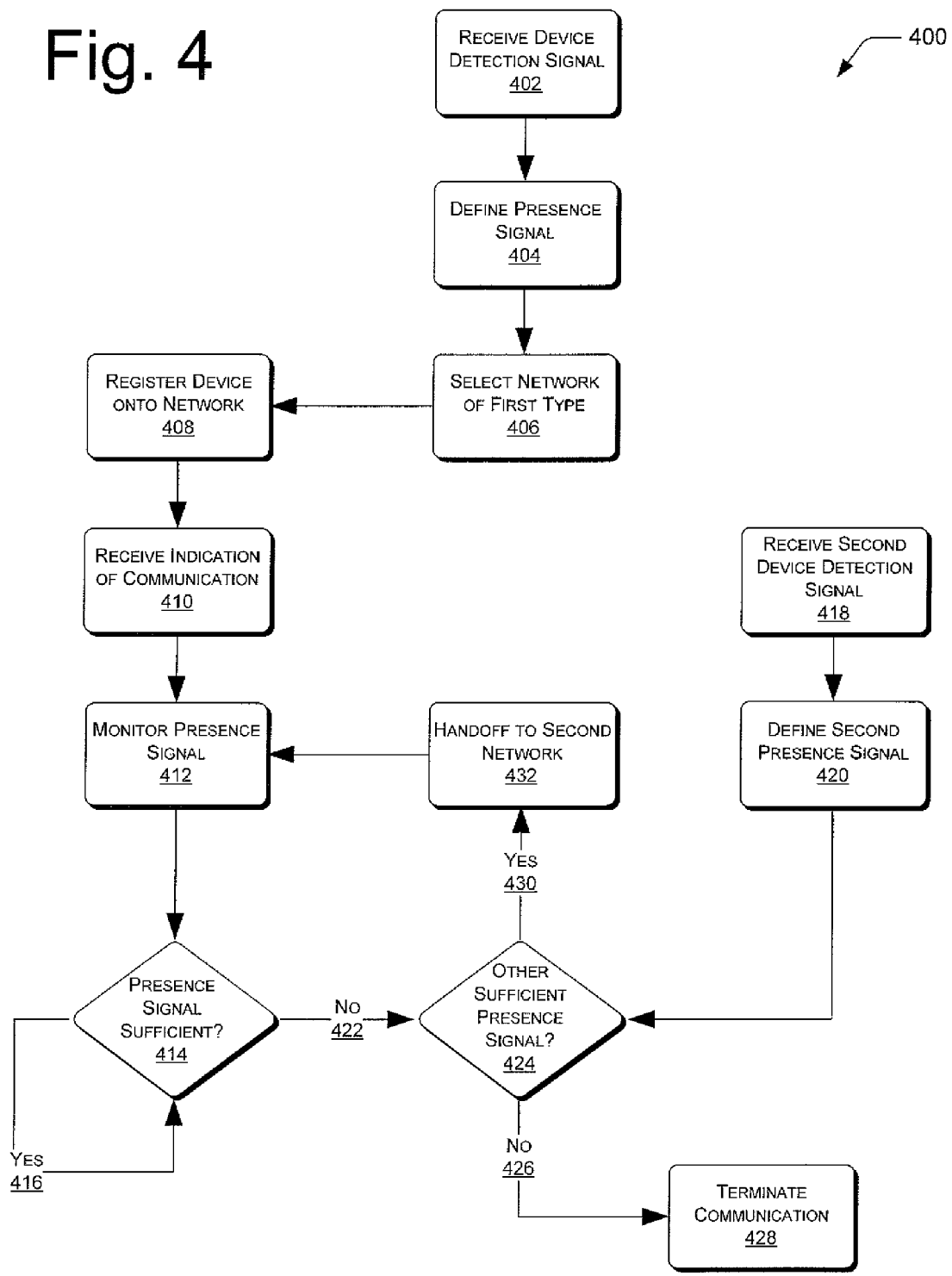
FIG. 4 is a flow diagram of a process for handing ongoing calls from a network of a first type to a network of a second type.

FIG. 4 illustrates a process flow 400 for handing ongoing calls from a network of a first type to a network of a second type. For convenience only, the process flow 400 is described in connection with components shown in FIGS. 1-3. However, it is understood that the process flow 400 may be performed with other components without departing from the spirit and scope of the description herein.

Block 402 represents receiving a device detection signal, which indicates that a multi-mode handset is proximate to a communication network of a first type. The communication network may be characterized as, for example, a circuit-switched network or a packet-switched network. FIGS. 2 and 3 show examples of the device detection signal at 202 and 212. FIGS. 1-3 show an example of the multi-mode handset at 104.

Block 404 represents defining a presence signal that varies in response to the condition of the device detection signal. FIGS. 2 and 3 show examples of the presence signal at 206 and 216.

Block 406 represents selecting the network of the first type for transmitting voice and/or data between the multi-mode handset and a destination. Block 406 may include applying one or more thresholds to the presence signal to determine whether the condition of the connection with the user permits transmitting voice and/or data over this connection.

Block 408 represents registering the multi-mode handset onto the network, assuming that the quality and/or strength of the connection with the multi-mode handset so permits. For instance, block 408 may be performed if the threshold analysis referred to in block 406 above is satisfied.

Block 410 represents receiving an indication of a communication between the multi-mode handset and a destination. FIGS. 1-3 show examples of a destination at 106. For example, a user or subscriber (e.g., 102 in FIGS. 1-3) may be using the multi-mode handset to carry on a conversation, access e-mail or voice mail, or the like.

Block 412 represents monitoring the condition of the presence signal for any signs of improvement or degradation. As noted elsewhere herein, assuming that the multi-mode handset and the user are mobile, then it is possible that as the multi-mode handset moves, it will encounter a variety of different physical environments. These different physical environments may interfere with signals passing to or from the multi-mode handset, causing the degradation of the device detection signal and/or the presence signal. Block 412 may include monitoring the presence signal over time to assess the condition of the connection with the multi-mode handset on an ongoing basis.

Block 414 represents evaluating whether the presence signal is sufficient to permit continued communications of voice/data to occur over the network selected in block 406. If the presence signal indicates that the connection with the multi-mode handset is in sufficient condition, then the process flow may take Yes branch 416 back to block 412 to continue monitoring the presence signal. It is noted that blocks 412 and 414 may be repeated at any suitable interval to monitor the continued state of the connection with the multi-mode handset.

In parallel with the processing already described, the process flow 400 may detect at least a second potential connection path for the multi-mode handset. More specifically, block 418 represents receiving a second device detection signal. This second device detection signal may be received in response to the multi-mode handset moving into the proximity of a second network, in addition to the network selected in block 406 above.

Block 420 represents defining a second presence signal associated with the multi-mode handset. This second presence signal indicates the condition of a potential connection between the multi-mode handset and the second network.

It is noted that blocks 418-420 may be repeated for other networks, as the mobile multi-mode handset passes into the proximity of other networks. In this manner, the process flow 400 may present one or more backup or secondary connections to the multi-mode handset, in the event that the connection with the first network degrades beyond acceptable levels.

Returning to block 414, if the presence signal associated with the first network degrades so that it falls below acceptable thresholds, then the process flow 400 may take No branch 422 to block 424. Block 424 evaluates whether a presence signal associated with at least a second network is sufficient to permit the communication referenced in block 410 to be handed over to the second network. For example, block 424 may include analyzing at least the second presence signal referenced in block 420. If more than one backup or secondary network is available for consideration, block 424 may be repeated to evaluate presence signals associated with these additional backup or secondary networks as candidates for receiving the handover.

From block 424, if no additional presence signals indicate that their corresponding networks are suitable for receiving the handover, then the process flow 400 may take No branch 426 to block 428. Block 428 represents terminating the ongoing communication is terminated if the signal from the first network is lost altogether.

Returning to block 424, if a presence signal associated with another network, of a different type than the first network, has sufficient strength and/or quality, then the process flow 400 may take Yes branch 430 to block 432. Block 432 represents handing over the ongoing communication to the second network.

After completing the handover, the process flow 400 may proceed to block 412, to monitor the presence signal associated with the second network. From block 412, the process flow 400 may proceed through subsequent blocks 414 and so on in a similar manner as described above.

As an example of the handover operation illustrated in FIG. 4, assume that a mobile user or subscriber is using the multi-mode handset to participate in an ongoing call while walking outside. Block 410 may include receiving an indication of this ongoing communication. While the user is outside the building, the handset may be coupled directly to a circuit-switched cellular network. Blocks 402-408 may represent the processing involved with registering the mobile user's handset onto the circuit-switched cellular network.

Assume further that, at some point, the mobile user walks inside a building while still participating in the ongoing call. When the user enters the building, the handset may lose connection with the cellular network, or service may degrade, because signals to or from the cellular network cannot penetrate the physical construction of the building. In this event, blocks 412 and 414 may detect and track this signal degradation. While the presence signal is deteriorating, but before it drops out entirely, block 424 may search for a suitable backup network. For example, a packet-switched network inside the building may provide a suitable backup network. If such a suitable backup network is found, block 432 hands to call over to the backup network. Because the process flow 400 detects ongoing deterioration and hands over the call before the first network drops out, the user's ongoing conversation or data transfer is not interrupted significantly when the user transitions from one physical environment to another, and from one type of network to another.

Figure 5:
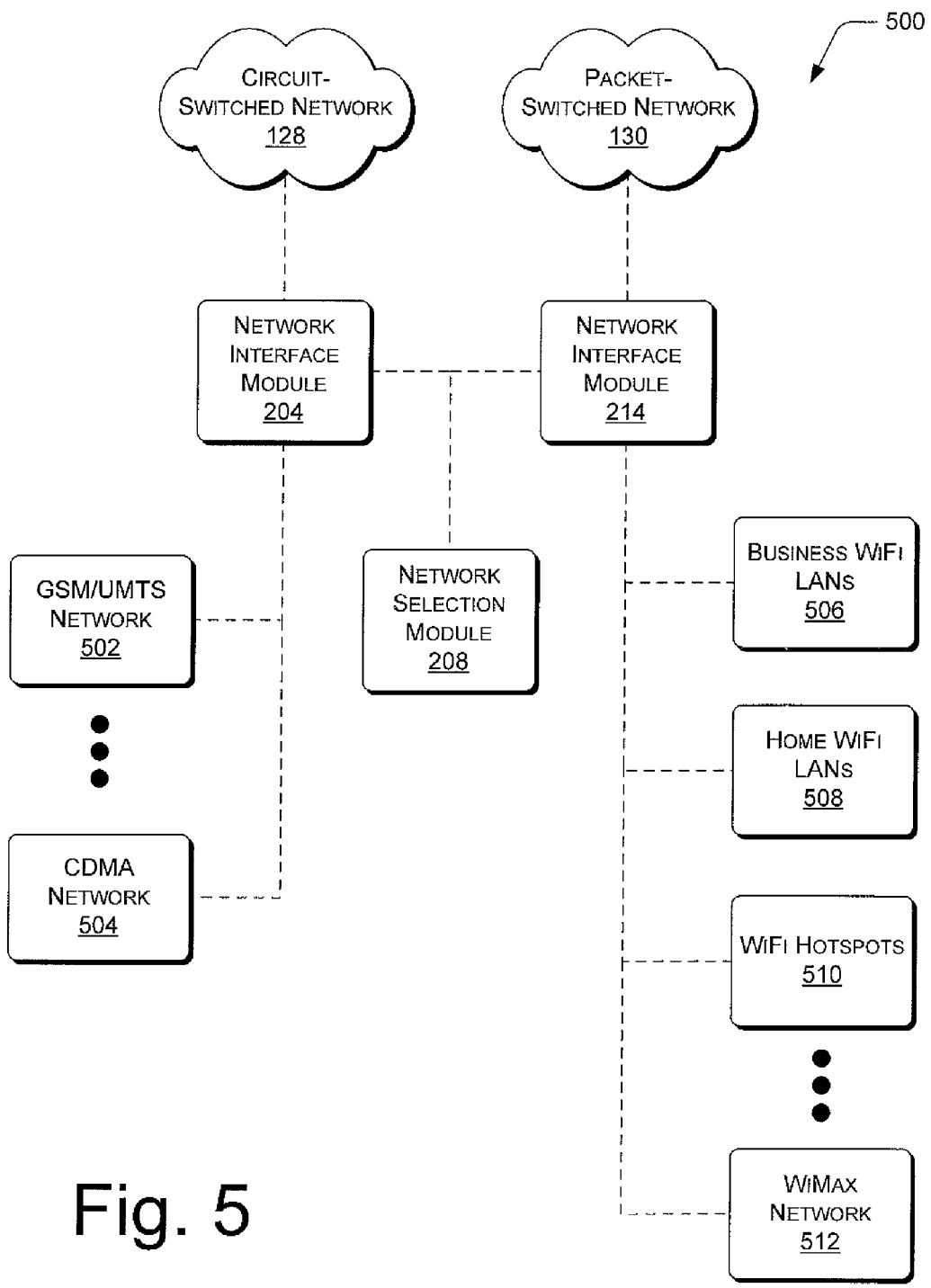
FIG. 5 is a block diagram illustrating various types of circuit-switched networks and packet-switched networks that may be employed in the environments described herein.

Having described the process flows 400 for handing off ongoing communications from one type of network to another, the discussion now turns to more detailed descriptions of illustrative types of networks with which the components described herein may operate, now presented in connection with FIG. 5.

FIG. 5 is a block diagram illustrating various types of circuit-switched networks and packet-switched networks. FIG. 5 also relates the network interface modules 204 and 214 and the network module 208 to these various types of networks. For convenience but not limitation, FIG. 5 organizes several illustrative network types into two categories: circuit-switched network types and packet-switched network types.

FIG. 5 shows the network interface modules 204 and 214 as associated with several types of circuit-switched networks and packet-switched networks, respectively. For example, the network interface module 204 may be compatible with a GSM/UMTS cellular network 502, a CDMA cellular network 504, and/or other types of circuit-switched networks. Turning to the network interface module 214, it may be compatible with one or more business WiFi LANs 506, home WiFi LANs 508, public WiFi hotspots 510, WiMAX wide area networks 512, and/or other types of packet-switched networks. It is noted that FIG. 5 shows these types of networks only for convenience of discussion, and not to limit possible implementations of the subject matter described herein. Other networks may be included in implementations without departing from the spirit and scope of the description herein.

Recall that the network selection module 208 may select from various types of networks as it receives presence signals indicating that the multi-mode handset is proximate these networks. Recall also that the presence signals indicate the proximity of the multi-mode handset to those networks. The network selection module may select one of these networks for transmitting voice/data, depending on the values of the presence signals, by activating the network interface module that corresponds to the selected network Additionally, the network selection module 208 may be weighted or biased so as to select certain networks in preference to other networks. For instance, the network selection module 208 may consider and weigh factors such as range of coverage, cost of airtime, available bandwidth, licensing issues, and the like. As an example, the network selection module may be configured to select circuit-switched networks when available, to handover communications to packet-switched networks when the circuit-switched networks become unavailable, and to hand the communications back to the circuit-switched networks when they become available again.

Figure 6:
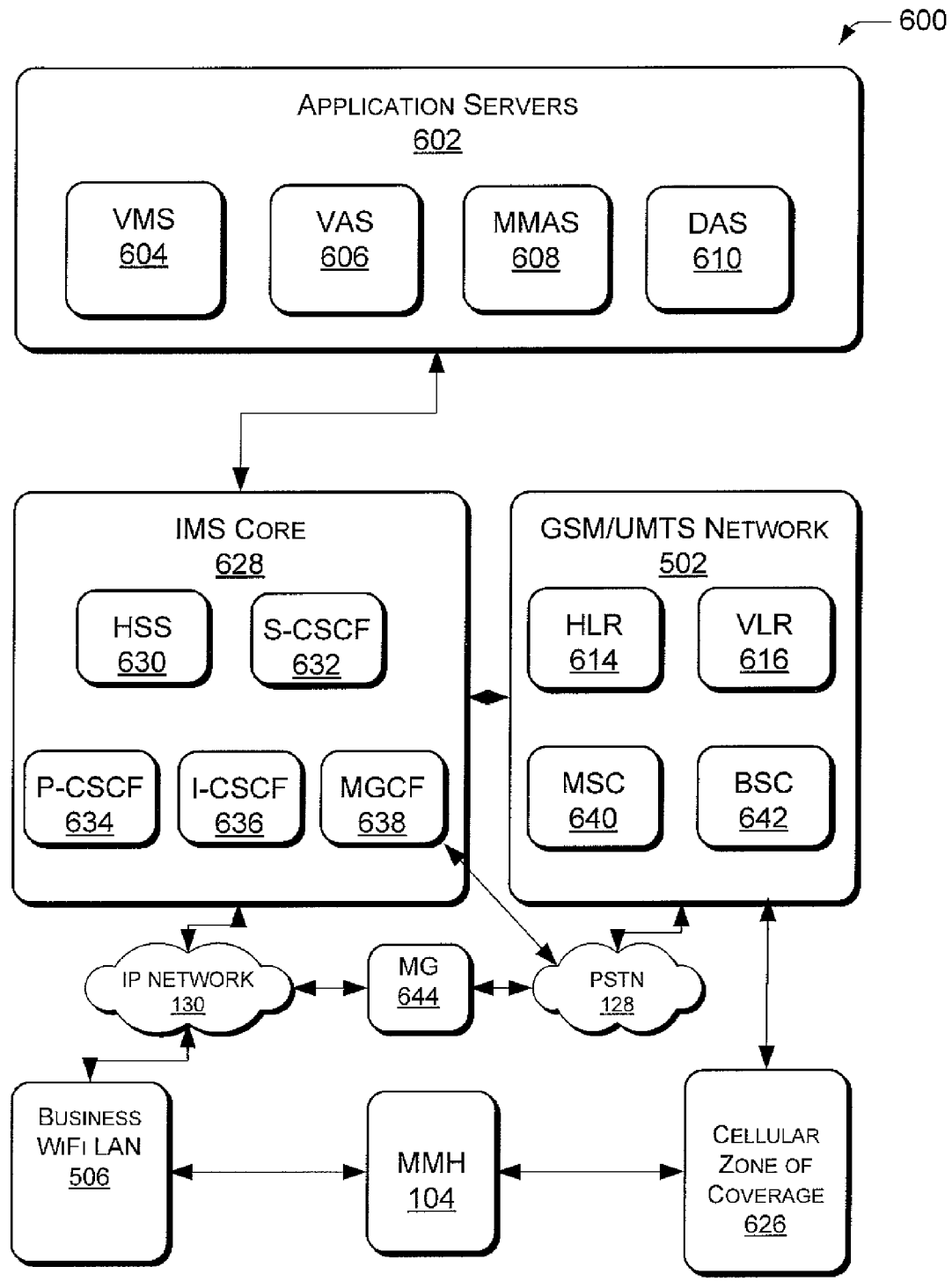
FIG. 6 is a block diagram of an exemplary operating system for implementing seamless enterprise and consumer mobility.

FIG. 6 illustrates an exemplary operating system 600 for implementing seamless enterprise and consumer mobility. In particular, FIG. 6 and the corresponding discussion describe different implementations of systems for providing seamless enterprise and consumer mobility. For example, the service provider 126, as shown in FIGS. 1-3, may host some or all of the components of the system 600.

Application Servers

The exemplary system 600 includes a framework that may be characterized as having different layers, as described further below. According to an exemplary embodiment, a set of application servers 602 may provide telecommunication services to the MMH 104. These services include but are not limited to access to email, voice mail, and data applications, and may be considered as the top layer of the framework. For example, the application servers 602 may include, but are not limited to, a voice mail server (VMS) 604, a voice application server (VAS) 606, a mobility management application server (MMAS) 608 and a data application server (DAS) 610. The application servers 602 may also include other servers that are omitted from FIG. 6 for clarity. Examples of such other servers may include email servers, media servers, presence servers or the like. This layer of application servers 602 may host and execute mobility telecommunication services upon receiving a signal from the multi-mode handset 104, regardless of which network the multi-mode handset 104 is registered on at a given time.

The application servers 602, and other servers described herein, may include respective processors that are adapted to access software stored on computer-readable media, and execute this software. This software may include one or more programs of computer-executable instructions stored in any appropriate programming language or code format.

In general, the VAS 606 includes certain applications and sub-applications that may be implemented to provide telecommunication services to the MMH 104. The equipment for providing these telecommunication services maybe co-located with the application servers 602, or may be located on the premises of a telephone company provider who owns and manages the equipment, and offers the telecommunication services to customers in an outsourcing arrangement. These mobility telecommunication services may include messaging services, call forwarding, call transfer, call waiting, telephone conferences, services for Internet, and the like. The telecommunications services may include features such as abbreviated dialing to members of a closed user group, call routing based on the time of day, and direct inward dial, where individual extensions are offered a direct and unique telephone number for incoming calls. In addition, the customer may choose from a variety of special services and features, depending on the needs of the customer. For example, in a business environment, the telecommunications services may be offered in packages or customized depending on the business needs, costs, and number of locations.

Furthermore, subscribers (e.g., the user 102 in FIG. 1) may use the MMH 104 at home by accessing a WiFi LAN (e.g., 508 in FIG. 3) located in their home. The WiFi LAN may enable the subscriber to access a broadband data service, such as Digital Subscriber Line (DSL) service, satellite Internet service, or cable modem service.

Mobility Management Application Server

The mobility management application server (MMAS) 608 may host the network interface modules 204 and 214 and the network selection modules 208, which are shown in FIGS. 2-3 above. The MMAS may perform several functions, as now described in more detail. One of these functions is receiving the registration of the multi-mode handset 104 from a profile subscriber server. In an exemplary embodiment, the user 102 is registered through a GSM/UMTS cellular network 502. The GSM/UMTS cellular network 502 may include one or more profile subscriber servers, such as a home location register (HLR) 614 or a visitor location register (VLR) 616, which may initially inform the MMAS 608 of the registration of the MMH 104 on the GSM/UMTS cellular network. For example, the HLR 614 or VLR 616 may inform the MMAS 608 whether the user 102 is in an active status, having registered the MMH 104 or in a non-active status, such as de-registering the MMH 104. The MMAS 608 establishes the registration status of the MMH 104. Furthermore, the MMAS 608 provides an update of the registration status to the profile subscriber servers, which may include, e.g., an HSS 630 (described in further detail below), an HLR 614, and a VLR VLR 616, and to the application servers 602, if appropriate.

The MMH 104 may connect to various networks, including Business WiFi LANs 506, Home WiFi LANs 508, Public WiFi Hotspots 510, WiMAX Networks 512, GSM/UMTS cellular networks 502, and CDMA cellular network 504. Thus, another function of the MMAS 608 is to track the network to which various multi-mode handsets 104 are connected, to enable delivery of telecommunication services across different ones of these networks, as described herein. By tracking the particular network to which the MMH 104 is connected, the MMAS 608 may enable a subscriber using the MMH 104 (e.g., user 102 in FIG. 1) to access telecommunication services from the VAS 606, voice mail server 604, or other application servers 602. In this manner, the MMAS 608 may perform at least some of the functions of the network interface modules 204 and 214, and the network selection module 208.

In an exemplary embodiment, the MMAS 608 may determine that the MMH 104 is at a Business WiFi LAN location 506 that is served by the packet-switched network 130. The network 130 may include, for example, an IP network. The MMAS 608 may associate an IP network address with the MMH 104 accordingly, and return this address upon request. The VAS 606 may then route incoming calls to the MMH using this network address within the Business WiFi LAN 506, thereby causing the MMH 104 to ring. If the user 102 does not answer the ringing MMH 104, the VAS 606 may send the call to an appropriate voice mail server (VMS) 604.

The VMS 604 may be a computerized system, such as an application server 602. The VMS 604 records telephone messages for users 102 who subscribe to a network service provider 126. The VMS 604 may store incoming telephone messages while the user 102 is on the line. In addition, users 102 may forward received messages to a voice mailbox associated with another user, as well as playing various greeting messages.

In another exemplary embodiment, the MMAS 608 may determine that the MMH 104 is within in a zone of coverage 626 that is served by, for example, by the GSM/UMTS cellular network 502. In this scenario, the MMAS 608 may request that the VAS 606 query the profile subscriber servers to obtain a network address or other identifier for the MMH 104, defined in the context of the GSM/UMTS cellular network 502. Given this GSM/UMTS cellular network address at which the MMH 104 is located, the VAS 606 may then route incoming calls to this network address.

The mobility management application server (MMAS) 608 manages transfers or handovers of calls from one type of network to another. For example, the MMAS 608 may transfer calls from the Business WiFI LAN location 506 to the GSM/UTMS network 502, and vice versa. Thus, the MMAS 608 provides mobility across multiple different types of networks, and seamless handovers or transfers between and among these different networks. The MMAS 608 may also transmit signals to and from the MMH 104 over IP packet data networks and circuit switched cellular networks. Thus, the MMAS 608 establishes registration status and tracks the location of the handset 104 by identifying the network to which the handset 104 is connected at any given time. The MMAS 608 also maintains a communication session by providing the user 102 access to telecommunication services. Finally, the MMAS 608 converts or translates between the schemes and protocols as used in packet-switched data networks (e.g., a VoIP-based network) and as used in circuit-switched or POTS networks. These schemes and protocols may handle data transfers, addressing, or the like.

Other Application Servers

As described above, other application servers 602 may include, but are not limited to, servers that provide voice, data, and/or integrated voice and data applications to users of the MMH 104. The system 600 may also include a data application server (DAS) 610 that may send and store data messages for the other application servers. The DAS 610 may also secure data in the MMH 104. The VAS 606 may send incoming calls to a voice mail server (VMS) 604. In particular, the VMS 604 may store incoming messages, manage telephone messages, play different message greetings, and the like. As shown in FIG. 6, the application servers 602 may interface with an IMS Core (described in detail below) depending on the network to which the handset 104 is connected at a given time.

Internet Protocol Multimedia Subsystem (IMS)

The system 600 may include an Internet protocol multimedia subsystem (IMS) core 628, which may include several different servers. The MMAS may control functions within the IMS core 628. FIG. 6 shows an example implementation of the servers within the IMS core 628. These servers may be suitable for processing data packets transmitted over, for example, the IP network 139. Overall, the IMS core provides mobile and fixed multimedia services to enable the handset 104 to communicate over IP-based networks. In implementations, the IMS core may enable users 102 to access telecommunication services using the MMH 104 seamlessly across different types of networks within a given enterprise. For example, the handsets 104 may move within this enterprise between, for example, the business WiFi LAN location 506 and the cellular zone of coverage 626, and vice versa. As the handset 104 move in this manner, the IMS core (and more generally, the system 600) may minimize the impact of geography and other physical or environmental factors on such services, by transferring or handing over the handsets to multiple different networks and types of networks, as appropriate.

The IMS core 628 may be implemented to communicate using the session initiation protocol (SIP). SIP enables handovers of ongoing communications between, for example, the business WiFi LAN 506 and the cellular zone of coverage 626. SIP allows telecommunications between multiple proxy and location servers by leaving the session and connection details to the servers. Furthermore, SIP offers a well-defined mechanism for device-to-device signaling, with, for example, the multi-mode handset 104. In a SIP-based implementation, the servers may be intelligent gateways capable of transmitting and/or receiving requests, commands, and/or data to the subscribers' location. The servers may also register and/or authenticate the subscribers' data, as well as provide features and services to the subscribers.

The network elements in the IMS Core 628 may include, but are not limited to, a HSS 630, a serving call session control function (S-CSCF) server 632, a proxy call session control function (P-CSCF) server 634, an interrogating call session control function (I-CSCF) server 636, and a media gateway control function (MGCF) 638.

The HSS 630 may enable a subscriber or user of the handset 104 to register with the IMS core 628. The HSS 630 may maintain a database containing profiles of various subscribers, as well as one or more initial filter criteria relating to the MMH 104. The HSS may identify any filters that may be engaged in call control logic to assist in call processing and to provide services during the call. The HSS 630 may also define network addresses associated with the application servers 602 that are engaged in a given call session to provide consumer telecommunication services. In an exemplary embodiment, the HSS 630 may identify the different application servers 602 that may be engaged in a given call session to provide applications and telecommunication services. The HSS 630 may handle the call sessions from the MMH 104. Therefore, the HSS 630 may authenticate and/or register subscribers who wish to access services using the handsets 104, and may record the network to which the handset 104 is currently connected, as appropriate. Furthermore, the HSS 630 may store any authentication and/or registration information associated with the subscribers and/or services.

The Proxy-Call Session Control Function (P-CSCF) server 634 may provide an entry server for the IMS core 628. The P-CSCF server may be used in implementations that include SIP-based technology. The P-CSCF server may process signaling messages defined under SIP, and may compress or decompress SIP messages. The P-CSCF server may be the first and/or the last IMS network element that communicates with an end point IMS device. These IMS devices may include the handsets 104, which in turn, may include (but are not limited to) land line telephones, devices using any Internet telephony technology, computers (whether desktop or mobile) that are connected to wireless or landline communication networks, personal digital assistants, WiFi SIP phones, and the like.

The Interrogating-Call Session Control Function (I-CSCF) server 636 may allow remote servers to locate and communicate with the IMS core 628. The I-CSCF server may also provide another entry point to the IMS core 628 from another network. For example, the I-CSCF server may provide an entry point for the circuit-switched network 128, which may take the form of a public-switched telephone network (PSTN). The I-CSCF server may also provide an entry point for the GSM/UMTS cellular network 502, and/or the IP network 130. Remote servers may use the I-CSCF server 636 as an entry point to the IMS core 628 for all SIP packets by querying the HSS 630 to obtain an address for the I-CSCF server 636, and thereafter directing SIP packets to this address. Once the I-CSCF server 636 has retrieved a location for a given handset 104, the I-CSCF server 636 may transmit any SIP packets that are addressed to the given handset to an appropriate Serving-Call Session Control Function (S-CSCF) server 632, which is now described in more detail.

The Serving-Call Session Control Function (S-CSCF) server 632 may operate as a primary SIP server, and may also control respective call sessions for the endpoint communication devices in the call, for example, the MMH 104. In an exemplary embodiment, the subscriber 102 may register with the network, and the S-CSCF server may interrogate the HSS to obtain information about the subscriber. For example, the S-CSCF server may download and upload profiles of the subscriber, may extract information about the subscriber's services, and may obtain addresses for the initial filters that are associated with the subscriber's services. Additional functions of the S-CSCF server may include handling SIP registrations, and forwarding SIP messages to the application servers 602. Additionally, the S-CSCF server may set up call sessions with the MMH 104, may engage the VAS 606 while setting-up the call sessions, may establish a call session with an answering device (such as MMH 104 and VMS 604), and may terminate the call session upon receiving a suitable message to end the call.

The IMS core 628 allows application server providers and operators to use different underlying architectures for network access. Service providers may include telephone service providers, such as interexchange and local exchange carriers including incumbent and/or competitive exchange carriers. Other telecommunication service providers may include Internet telephone service providers (VoIP), wireless telephone service providers (cellular), and the like. By using communication services with various service providers, communication may be integrated seamlessly across multiple different types of networks. In particular, the IMS core may operate with landline, wireless and mobile networks, including broadband networks such as coaxial cable-based networks, digital subscriber line (DSL) networks, W-CDMA, CDMA, GSM, WLAN and the like.

The media gateway control function (MGCF) 638 enables multimedia communications across networks. The MGCF 638 may serve as an interface between a circuit-switched network (PSTN) and a packet-switched network (VoIP). The MGCF may receive a call from a circuit-switched network (e.g., the PSTN 222) or GSM/UMTS cellular network 502 and translate to an IP-based protocol suitable for the IP network 130 so that the IMS core can process the call. The MGCF 638 may translate between disparate telecommunication networks, such as the PSTN 128 and the IP network 130, or succeeding generations of such networks, 2G, 3G, and the like. The MGCF converts between the transmissions and coding techniques used by these different networks. Additionally, the MGCF may provide call control and signaling functionality. Because the IMS core has the above capabilities, it may be characterized as being "access network independent".

The IMS core achieves the capabilities described above through open interfaces defined between a control layer and a service layer. The control layer may include the servers 630, 632, 634, and 636, while the service layer may include the application servers 602. These open interfaces allow elements and calls or sessions to be handed over between different types of networks. The IMS core allows consumer mobility and seamless handover of a user's calls between, for example, a landline network connection at the business WiFi LAN location 506 and a cellular connection within the zone of coverage 626, while the user is roaming or traveling there between. While FIG. 6 illustrates the business WiFi LAN location 506, it is understood that the home WiFi LAN 508, the WiFi hotspots 510, and the WiMAX network 512 may be included as well. For example, the user 102 with the MMH 104 may access a landline in the office location. When the MMH 104 is proximate the business WiFi LAN location 506, the MMH 104 may sense radio signals from both the business WiFi LAN 506 and the GSM/UMTS cellular network 502, but nevertheless may be biased towards communicating over the business WiFi LAN 506. When the MMH 104 moves between the business WiFi LAN 506 and the GSM/UMTS cellular network 502, the transition may be seamless from the perspective of the user. In providing the foregoing functions, the IMS core provides access to IP-based network services, provided by, for example, the VMS 604, VAS 606, and the like.

GSM/UMTS Cellular Network

The system 600 may include certain components implemented in connection with the GSM/UMTS cellular network 502. The GSM/UMTS cellular network provides one illustrative form of network access. As described above, the GSM/UMTS cellular network may include, but is not limited to, the HLR 614 and the VLR 616. The GSM/UMTS cellular network may also include a Mobile switching center (MSC) 640 and a base station controller (BSC) 642. These components are now described in more detail.

The home location register (HLR) 614 is a location register to which a user identity is assigned for recording purposes. The HLR registers a wireless cellular phone, such as the MMH 104, for service by creating a record in a database. The HLR may create this record when the wireless cellular phone is turned on and is located within a wireless service area where calls may be transmitted to the MMH. The HLR may be implemented in wireless cellular networks including, but not limited to, an advanced mobile phone system (AMPS), a global system for mobile communications (GSM), a personal communications systems, and the like. The HLR may also store authentication and/or registration information. It may also include subscriber data related to features and services to which the user has subscribed. In non-limiting embodiments, a user identity, a user name, a user number, and/or a password may be used to register and/or authenticate subscriber information.

The visitor location register (VLR) 616 is a location register used by the mobile switching center (MSC) 640 to retrieve information for handling of calls to or from a visiting subscriber. A visiting subscriber is understood to be a subscriber other than a subscriber registered in the HLR. The VLR informs the HLR 614 when a visiting subscriber (or other user of the subscriber's handset 104) has entered a coverage area, and indicates which services the visiting subscriber may access. Thus, the HLR may verify the features to which a given subscriber or user has access, when the subscriber or user is roaming outside the coverage area supported by a given wireless provider. The VLR may also delete a subscriber record after a given period in which no activity occurs.

The mobile switching center (MSC) 640 may be implemented as a cellular site accessible via radio frequency signals. The MSC may deliver calls to subscribers or users 102 of the handsets 104, based on information from the HLR or the VLR. Furthermore, the MSC may provide an interface for user traffic between the GSM/UMTS cellular network 502 and PSTNs 128 or other MSCs in the same or other networks. The MSC may also provide calling and mobility management for circuit-switched networks (e.g., PSTN 128). Having provided this interface, the MSC enables transmission of signals from the circuit-switched network to any other network. Thus, the MSC provides signaling for inter-system handoffs, as well as facilitating automatic roaming. The HLR or VLR may serve more than one MSC.

In an exemplary embodiment, the base station controller (BSC) 642 transmits and receives voice signals over the radio spectrum to and from the MSC. The BSC may allocate radio channels among various users of the MMHs, and may operate at various different radio frequencies. In implementations, the MSC 640 may facilitate data transfer between the MMH, the BSC, and a wireless data gateway (not shown) in the cellular network. The HLR may store information indicating a particular MSC on which the MMH 104 is registered.

The system 600 may also include a media gateway (MG) 644 that provides interoperability between the PSTN 128 and the IP network 130. The media gateway converts packet-switched voice/data traffic to circuit switched voice/data traffic, and vice versa.

The exemplary system 600 operates on signals from the multi-mode handset 104, which executes software implemented as described in combination with the application servers 602, the IMS core 628 and/or within the GSM/UMTS cellular network 502, the PSTN 128, and the IP network 130. These signals may include a request, a command and/or data, text messages, voice transmissions, computer-readable instructions, and the like. Any of the foregoing may be sent in analog or digital form. Accordingly, the system 600 may track and manage call progress. The system may also convert or translate between telephone numbers and addressing schemes used on a data or IP-based network 130 and those used on a GSM/UMTS cellular network 502.

Multi-Mode Handset

When connected to the business WiFi LAN location 506, the handset 104 may connect to telecommunication services through the IP network 130. The handset 104 may access telecommunication services using either unlicensed wireless or licensed cellular technologies. An example of a suitable unlicensed wireless technology is the IEEE 802.11 wireless networking standard. An example of a suitable licensed cellular technology is GSM or CDMA. A non-limiting example of the handset 104 is a cordless WiFi SIP phone.

In possible implementations, the multi-mode handset 104 may be designed to work on more than one frequency, including but not limited to frequencies defined under advanced mobile phone system, global system for mobile communications (GSM), personal communications systems and the like. This capability to operate on different frequencies allows the handset 104 to operate in regions that use different frequencies (e.g., 900 MHz, 1850 MHz, or other frequencies). To support digital communications, the handset 104 may operate under schemes such as time division multiple access (TDMA), code division multiple access (CDMA), advanced mobile phone system (AMPS), general packet radio service (GPRS), and universal mobile telecommunications system (UMTS). The multi-mode handset 104 may also be compatible with a second generation (2G) or a third generation (3G) network. As compared to other wireless networks, 2G or 3G networks may have greater bandwidth capacity, which may allow faster data download rates.

The MMH 104 allows for a seamless handover of telecommunication services between the GSM/UMTS cellular network and the IP network. The handset 104 may include control logic that sends and receives information regarding a signal addressed to the handset 104. The MMH 104 registers with a profile subscriber server, and establishes registration status with the MMAS 208, which may track the location of the MMH. More particularly, the handset 104 may communicate from the office location using the IP network. From the office location, the handset 104 may then move into the mobile location, which uses the cellular network, independent of constraints arising from geographic or regional differences, network incompatibilities, or differences in schemes for implementing telephone numbers or other addresses. The mobile location enables consumer mobility from one position because the user 102 need not be connected to a particular network or landline. For example, the mobile location may represent any location where the multi-mode handset 104 is outside of the office location. Mobile locations may include locations where the user 102 may move freely. Other mobile locations may include sites, such as public areas, parks, retail stores, universities, schools, and hot spots.

The multi-mode handset 104 allows users 102 to access telecommunication services. The multi-mode handset 104 may include a processor and control logic that allows users to access the MMAS 608, the VMS 604, the VAS 606, and/or a DAS 610. For example, these communication services may include outsourced telecommunications services, voice communications, data and text. A user may access applications such as voice mail, email, word processing, spreadsheet, or other similar applications. When the multi-mode handset 104 communicates with the various networks, it may first register with a profile subscriber server, assuming that the subscriber has subscribed with a network provider that offers these telecommunication services.

Figure 7:
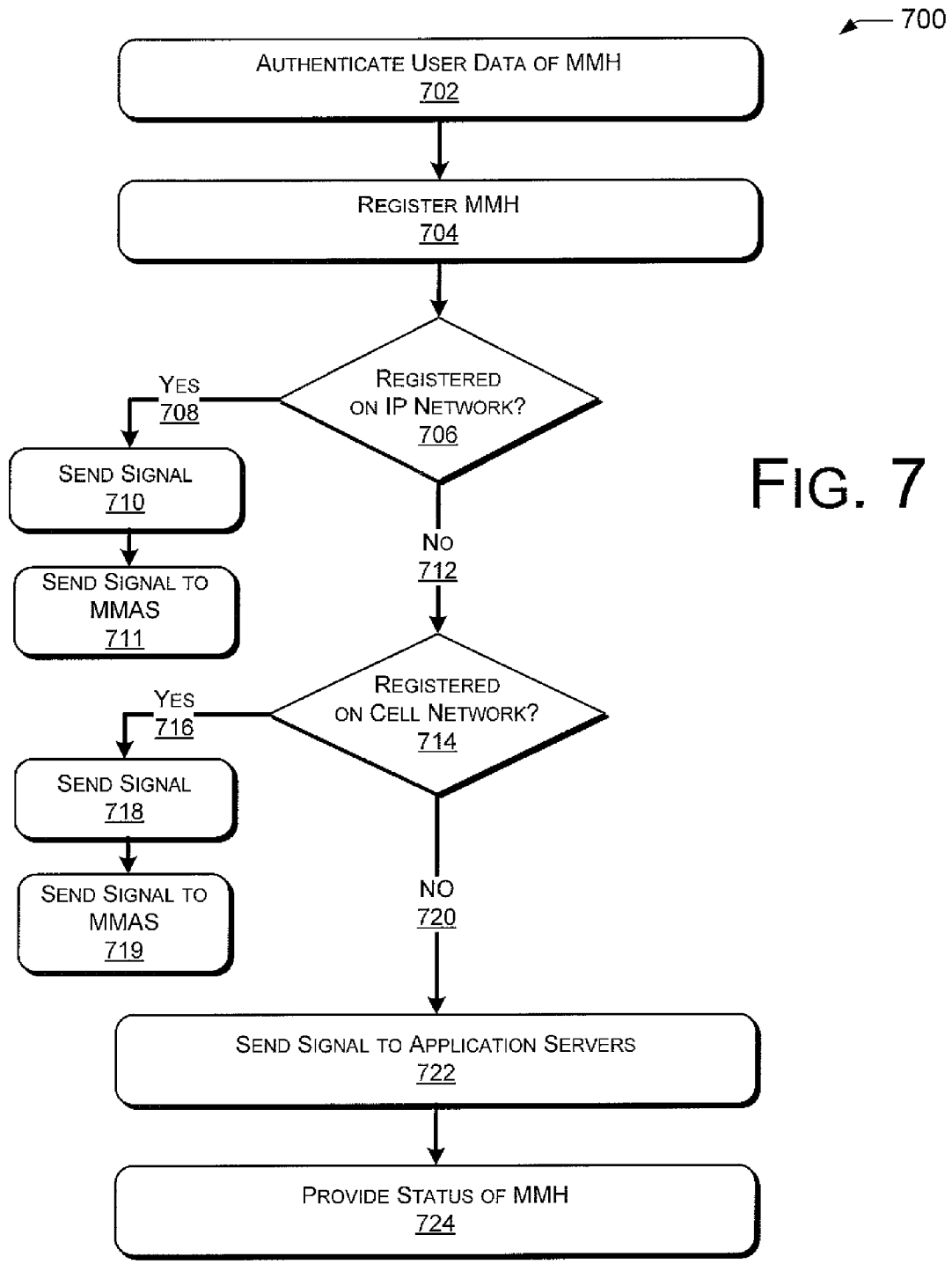
FIG. 7 is a flow diagram of a process for authenticating and registering a multi mode handset on a cellular network or an IP network.

FIG. 7 illustrates a process flow 700 for authenticating and registering a multi mode handset on a cellular network or an IP network. A non-limiting example of the multi mode handset is shown at 104 in FIGS. 1-3. Non-limiting examples of the cellular network and the IP network are shown in FIG. 6 at 128 and 130, respectively. Only for convenience of this discussion, the method 700 and other methods are described here in connection with certain systems or components. However, it is understood that these methods may be performed with other systems or components without departing from the scope or spirit of the description herein. The order in which the process is described is not intended to be construed as a limitation, and any number of the described process blocks maybe be combined in any order to implement the method, or an alternate method.

When a user 102 powers on the multi-mode handset 104, different processing can occur, depending on whether the handset 104 is within a range to effectively communicate with a cellular network, such as the GSM/UMTS cellular network 502 or an IP network 130. In block 702, a user of the multi-mode handset 104 may be authenticated by a profile subscriber server or the like. The profile subscriber server may receive a signal, when the user or subscriber 102 powers on the multi-mode handset 104. A signal may facilitate information exchange between two different entities regarding a network connection. For example, the profile subscriber servers, such as those shown in FIG. 6 at 630, 614, and 616, may store data representing the identities of authorized subscribers or users 102 of the handsets 104.

In block 704, registering the multi mode handset 104 occurs through one or more profile subscriber servers. Non-limiting examples of profile subscriber servers include the home subscriber server 630, the home location register 614, or the visitor location register 616 shown in FIG. 6. The method 700 may be performed, at least in part, when the multi-mode handset 104 is handed-off from a given network to another network when a user 102 is roaming, traveling, or otherwise moving outside a preselected coverage area associated with a given network. When the multi-mode handset 104 is turned on within a given coverage area, a signal is sent to the network module servicing that coverage area. The signal represents a request that the handset 104 be registered onto that given network. Thus, the multi-mode handset 104 is in an active state. As described elsewhere herein, the given network may be, for example, the IF network 130 or the cellular network 128.

In block 706, a determination is made whether the multi-mode handset 104 is registered on the IP network 130. If so, the method 700 takes Yes branch 708 to block 710, which represents sending a signal communication via radio frequency from the multi-mode handset 104 over the IP network 130. In block 711, the handset 104 sends a signal to the mobility management application server 608 to establish registration, to track location and status of the handset 104. Returning to block 706, if the handset 104 is not registered on the IP network, then the method 700 takes No branch 712 to block 714.

In block 714, a determination is made whether the multi-mode handset 104 is registered on the cellular network 128. If so, then the method 700 takes Yes branch 716 to block 718, which represents sending signals from the multi-mode handset 104 over the cellular network 128. In block 719, the mobility management application server 608 receives signals to establish registration, to track location and status of the handset 104. Thus, the mobility management application server 608 identifies the network to which the multi-mode handset 104 is connected at any given time.

Returning to block 714, if the handset 104 is not registered on the cellular network, then the method 700 takes No branch 720 to block 722. Block 722 represents an alternative in which the multi-mode handset 104 is not registered on any current network. For example, the MMH may not be powered on. In this case, request, command or data signals and the like from the handset 104 are sent to a voice application server (e.g., server 606 in FIG. 6), to a voice mail server 604, or to other type of application server. Block 724 represents providing a status of the multi-mode handset 104 to profile subscriber servers, such as the servers 630, 614, and 616 and MMAS 608 as shown in FIG. 6.

As described above, if the SIP protocol is utilized, the method 700 may include interacting with a home subscriber server 630, a serving call session control function (S-CSCF) 632 server, a proxy call session control function (P-CSCF) 634 server, and an interrogating call session control function (I-CSCF) 636 server. The servers may manage a handover of the multi-mode handset 104 as it moves back and forth from the cellular network 128 to the IP network 130. The servers record registration data of the MMH 104. For example, when the MMH 104 is within a range where it may communicate with the IP network 130, the registration of the MMH 104 on the servers may be removed from the cellular network 128 and may be registered on the IP network 130 through an access point or the like. As a result, roaming from one network to another network allows a user 102 to maintain a communication session.

Figure 8:
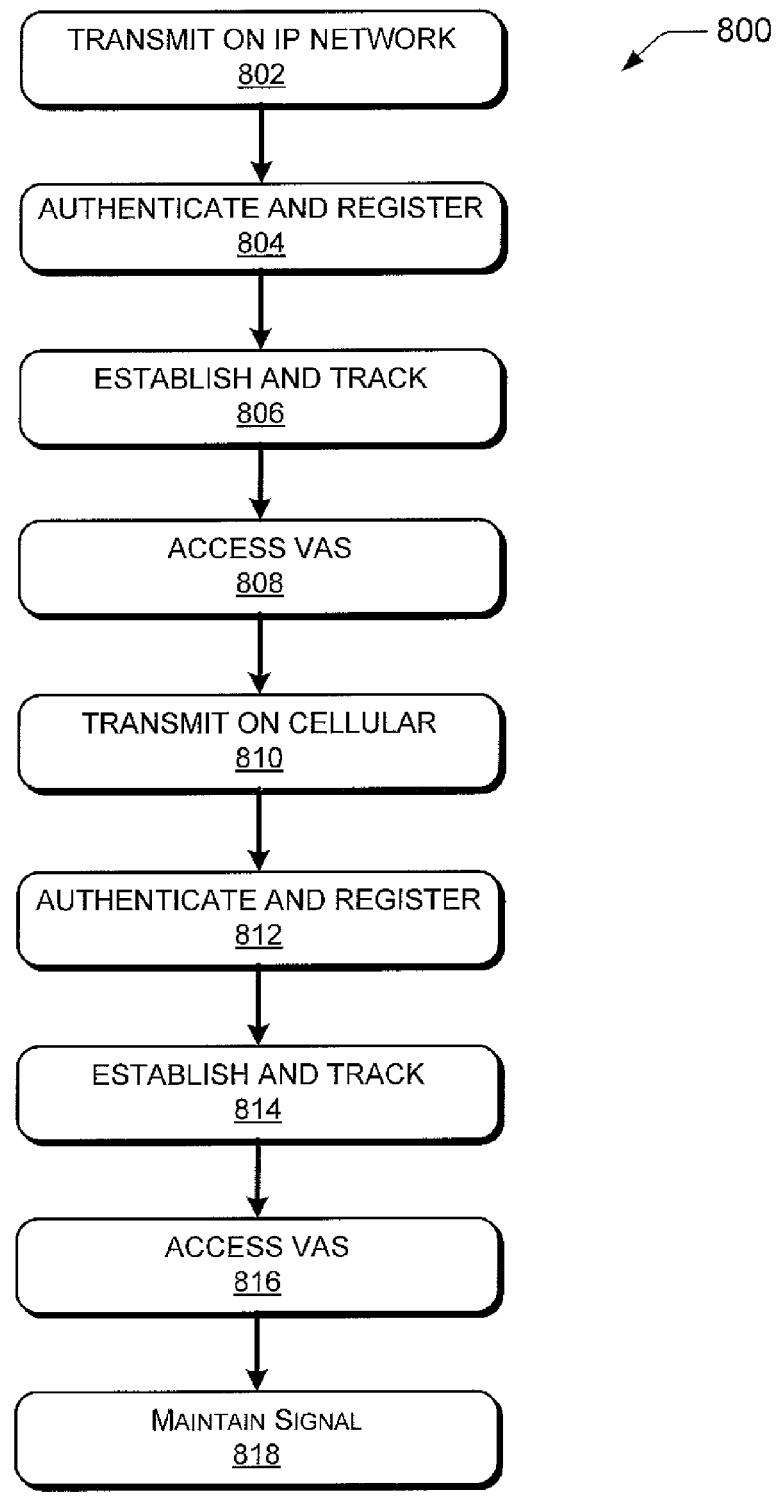
FIG. 8 is a flow diagram of a method for authenticating and registering a multi mode handset onto the IP-based network and moving onto the cellular network.

FIG. 8 illustrates a method 800 for authenticating and registering a multi mode handset 104 onto an IP-based network and moving onto a cellular network. Non limiting examples of the multi mode handset 104 are shown above in FIGS. 1 and 2, and are described further below in FIG. 11. The method 800 may be performed, at least in part, when the multi-mode handset 104 is turned on or is placed in a mode in which the handset may transmit using an IP network, such as the IP network 130, as shown in block 802. On the other hand, the method 800 may be pedal lied, at least in part, when the MMH 104 is turned on, or placed in a mode in which the handset may connect to a cellular network initially and then move to an IP network.

In block 804, the authentication and registration of the multi-mode handset 104 may be accomplished by querying a database of the home subscriber server 630 in the IMS core. The HSS 630 keeps the profile of the subscriber's service, an "initial filter criteria" which identifies the filters that must be engaged in a call to assist in call processing and provide services during the call. The "filter criteria" defines the different application servers 602 that are engaged in the call session to provide applications and services. The seamless enterprise and telecommunication service operates by using a collection of application servers 602, including but not limited to voice mail server 604, voice application server 606, MMAS 608, and other application servers. The applications engaged in the call processing are identified within the 'call filter criteria' and is stored in the HSS 630.

In another exemplary embodiment (not shown), the HLR 614 may be residing within the HSS 630. Thus, the MMH 104 may register directly with a HLR that is currently residing within the HSS 630, versus having to register through the HLR 614 in the GSM/UMTS cellular network 502.

In block 806, the mobility management application server 608 establishes the registration status of the multi-mode handset 104 in response to receiving the registration data from the home subscriber server 630. The mobility management application server 608 sends a signal to the handset 104, identifying the network to which the handset 104 is registered. The mobility management application server 608 defines an IP address for the handset, and communicates this IP address to the HSS 630.

In block 808, the user 102 may send a request, a command, or the like to the VAS 606 that is configured to communicate with the multi-mode handset 104. In one exemplary embodiment, the VAS 606 receives the network address assigned to the handset from the mobility management application server 608. In turn, the VAS 606 establishes a network connection with the multi mode handset 104, to allow the multi mode handset 104 to access communication services.

Block 810 represents when the multi-mode handset 104 is within range of a GSM/UMTS cellular network (e.g, FIG. 5 at 502). When the multi-mode handset 104 is within a cellular coverage area, a signal is sent to the GSM/UMTS cellular network servicing that coverage area. The signal represents a request for the handset 104 to be registered onto that given GSM/UMTS cellular network.

Block 812 represents authenticating and registering the multi-mode handset 104 onto the cellular network. Block 812 may include querying a database of the home location register 614 and/or the visitor location register 616. The HLR 614 and/or VLR 616 maintains a database profile of the subscriber's service.

Block 814 represents sending a signal over the GSM/UMTS cellular network to the mobility management application server (MMAS) 608. Block 816 represents enabling the user to access the VAS 606. Block 818 represents maintaining signals relating to an ongoing communication as the multi-mode handset 104 moves back and forth from one network location to another network. Blocks 402-418 may be repeated when the handset changes networks.

Figure 9:
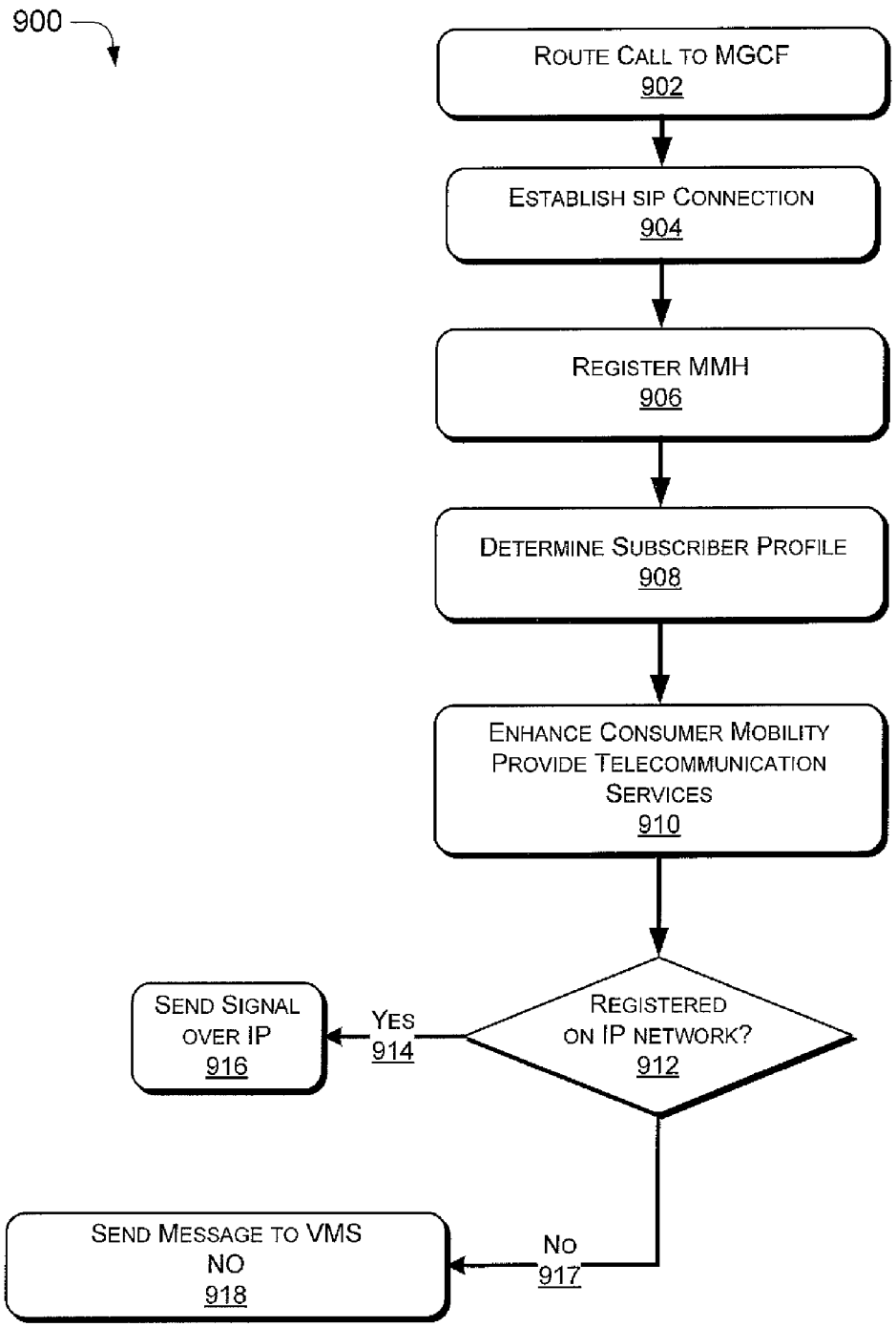
FIG. 9 is a flow diagram of a method for supporting a multi-mode handset.

FIG. 9 illustrates a method 900 that is performed to support a multi-mode handset. Non-limiting examples of the multi mode handset 104 are shown above in FIGS. 1 and 2, and are described further below in FIG. 11. The method 900 may be performed, at least in part, when the MMH 104 is turned on or placed in a mode in which the MMH 104 may connect to a circuit-switched network, such as the PSTN 128 shown in FIG. 6. Block 902 may be performed when the user 102 initiates a call using the MMH 104, when the MMH is in communication with a circuit-switched network, such as the PSTN. Block 902 represents the PSTN routing the call to the MGCF 638.

In block 904, the MGCF 638 establishes a SIP connection through an IP network, such as the IP network 130. The MGCF 638 may receive the call from a circuit-switched network (e.g., the PSTN 128 or the GSM/UMTS cellular network 502) and translate the circuit-switched traffic to IP-based traffic so that the IMS core 628 can handle the call. The MGCF 638 provides call control and signaling functionality.

Block 906 represents registering the MMH on the IP network. Block 906 may include querying the HSS 630 to determine which S-CSCF 632 supports the subscriber's telecommunication services. The I-CSCF 636 provides the entry point of call to the IMS core 628 from another network, such as PSTN 128. Once the I-CSCF 636 has queried the HSS 630, the HSS 630 returns the profile subscriber information to the I-CSCF 636. The I-CSCF 636 passes control to the identified S-CSCF 632.

In block 908, the S-CSCF 632 queries the HLR 614 to determine the subscriber profile and any "initial filter criteria". The HLR 614 may define the application servers 602 that are engaged in the call to provide telecommunication services and ensure consumer mobility. Then the S-CSCF 632 passes control of the call to the VAS 606.

In block 910, the VAS 606 queries the HSS 630 to determine the subscriber profile for telecommunication services and queries the MMAS 608 to enhance consumer mobility and provide telecommunication services. The VAS 606 queries the HSS 630 for the subscriber settings for consumer telecommunication services, such as any services outsourced to a third party, voice mail, and the like. The VAS 606 then queries the MMAS 608 to determine the location registration of the handset 104 in order to enhance consumer mobility. The MMAS 608 is configured to track the network with which the multi-mode handset 104 is registered The MMAS 608 may also determine the registration status of the MMH 104 and exchange commands, requests, and data signals with the MMH 104. These signals may include text or voice-based information. The application servers 602 and the IMS 628 may be implemented based on the telecommunication services available. These services are implemented via the network during the call set up or may be implemented on the control logic of the MMH 104. In non-limiting exemplary embodiments, the MMH 104 may support IP-based signaling or SIP signaling for call set up. In yet another non-limiting exemplary embodiment, the MMH 104 may support both for call set up.

An exemplary embodiment may include the MMAS receiving the network location from the home location register, and establishing a network connection to allow the multi-mode handset access to telecommunication services.

In block 912, the MMAS 608 tracks the location of the MMH 104 by evaluating whether it is registered onto an IP network. If the MMH 104 is registered onto an IP network, the method 900 takes Yes branch 914 to block 916, which represents sending to the MMAS 608 an address to which the MMH 104 is registered on the IP network.

Returning to block 912, if the MMH is not registered on an IP network, the method 900 takes No branch 917 to block 918. Block 918 represents sending an initial signal to the VAS 606, which in turn sends a message to the appropriate VMS 604 to enable secondary call treatment.

An exemplary method to register the multi-mode handset 104 in the GSM/UMTS cellular network involves interacting with the IMS core 628. The method includes registering on the GSM/UMTS cellular network 502 with the HSS 630 to establish the multi-mode handset 104 is in an active state. The registration status may be sent directly to the IMS servers 632, 634, and 636. Then, the commands or messages may be forwarded to the application servers 602.

Figure 10:
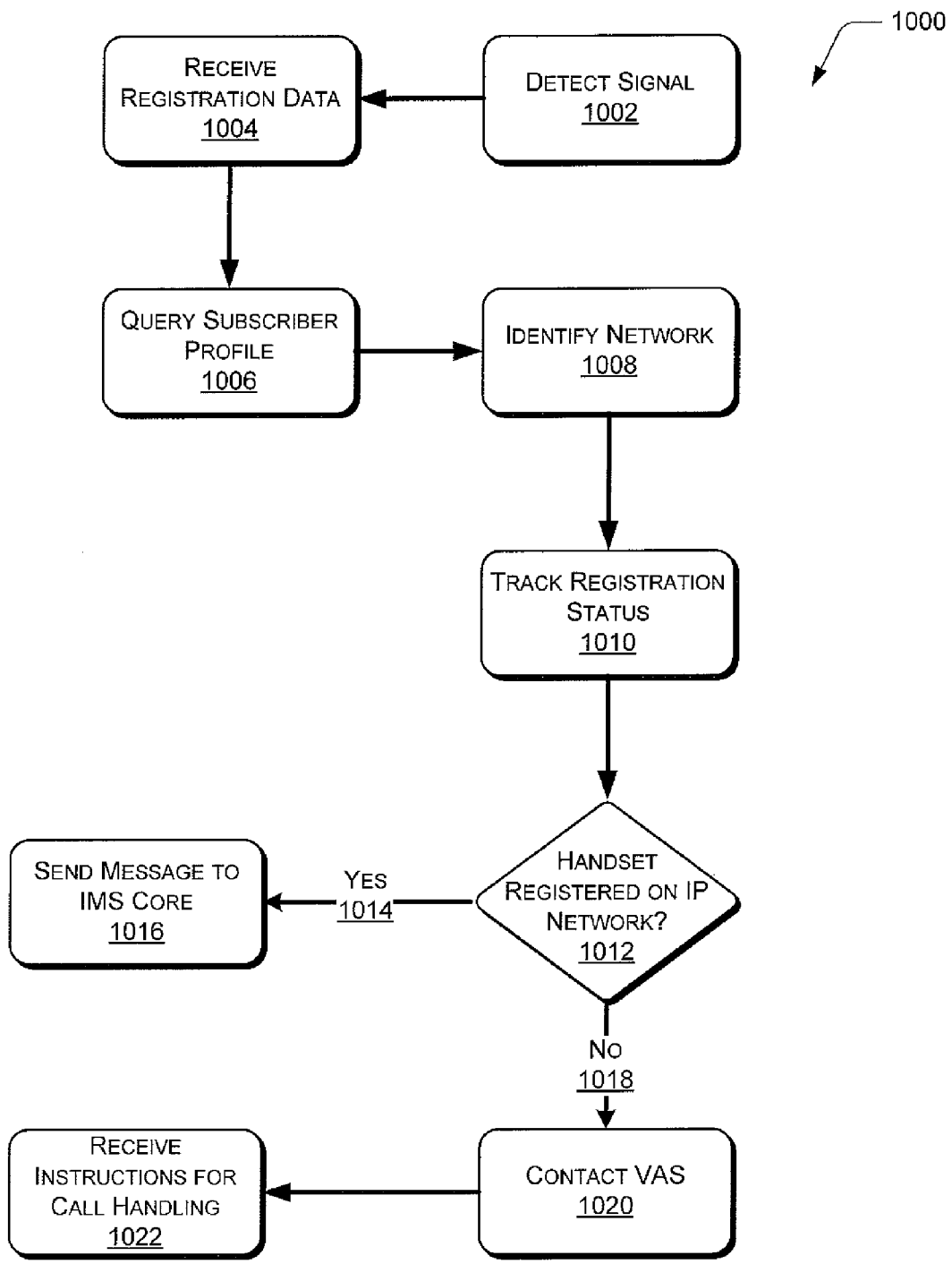
FIG. 10 is a flow diagram of a method that may be performed by a mobility management application server (MMAS).

FIG. 10 illustrates a method 1000 that may be performed by the MMAS 608. In Block 1002, the MMAS 608 detects a signal received from the MMH 104. This MMH may send this signal when the MMH powers-on and executes applications stored in the MMH. Additionally, the MMH 104 may send the signal received in block 1002 when it is in an "on" or "transmitting" mode. In any event, block 1002 represents the MMAS 608 detecting the signal.

In block 1004, the MSC 630 receives information from a profile subscriber server, such as home subscriber server 630, to authenticate and to register the MMH 104. In an exemplary embodiment, the MSC 640 uses a signaling protocol for intersystem handoff and automatic roaming. The signaling protocol may include IS-41 (Interim Standard 41) or GSM MAP (Mobile Application Part) or any cellular signaling protocol.

In block 1006, the registration status of the MMH 104 is determined by querying the profile subscriber server, the HSS 630. If the handset 104 is on, it begins authenticating and registering for consumer telecommunication services. Once the registration status of the MMH 104 has been retrieved from the HSS 630, the status information is communicated to the MMAS 608. The MMH 104 is now registered with the HSS 630 and in an active state.

In block 1008, the MMAS 608 identifies the network with which the MMH 104 is registered at a particular time. The MMAS 608 enhances consumer mobility by identifying the network to which signals should be sent to reach the MMH 104. In block 1010, the MMAS 608 tracks the registration status of the MMH 104 and determines whether the MMH is registered on an IP network or on a cellular network. In block 1012, if the MMAS 608 tracks the status of the MMH 104 as being registered on an IP network, such as the business WiFi LAN shown at 506 in FIGS. 5 and 6, then the method 1000 may take Yes branch 1014 to block 1016. Block 1016 sends the IP address to which the MMH is registered to the IMS Core 628. However, from block 1012, if the MMAS 608 tracks the location of the MMH 104 as being registered on a cellular network within the zone of coverage 626, then the process flow 1000 takes No branch 1018 to block 1020. Block 1010 represents contacting the VAS 606. In turn, the VAS 606 may send any communications to the MMH according to the network registration information received from the MMAS 608.

Block 1022 represents receiving instructions from, for example, the VAS 606 indicating where to send calls to the MMH. For example, these instructions may specify that the calls incoming to the MMH be transmitted to the MSC 640 in the GSM/UMTS cellular network 502 or to the IMS core 628, depending on whether the MMH is currently registered on, respectively, a cellular network or on an IP network. For example, an incoming call signal may notify the MMH that the PSTN has received the call signal. Next, the MMAS 608 may query the subscriber profile to determine the registration status of the MMH. In an exemplary embodiment, if the MMH 104 is registered on the IP network 130, the MMAS 608 can send the signal to the MMH 104 via a corresponding MSC 640 and the IP network 130.

Figure 11:
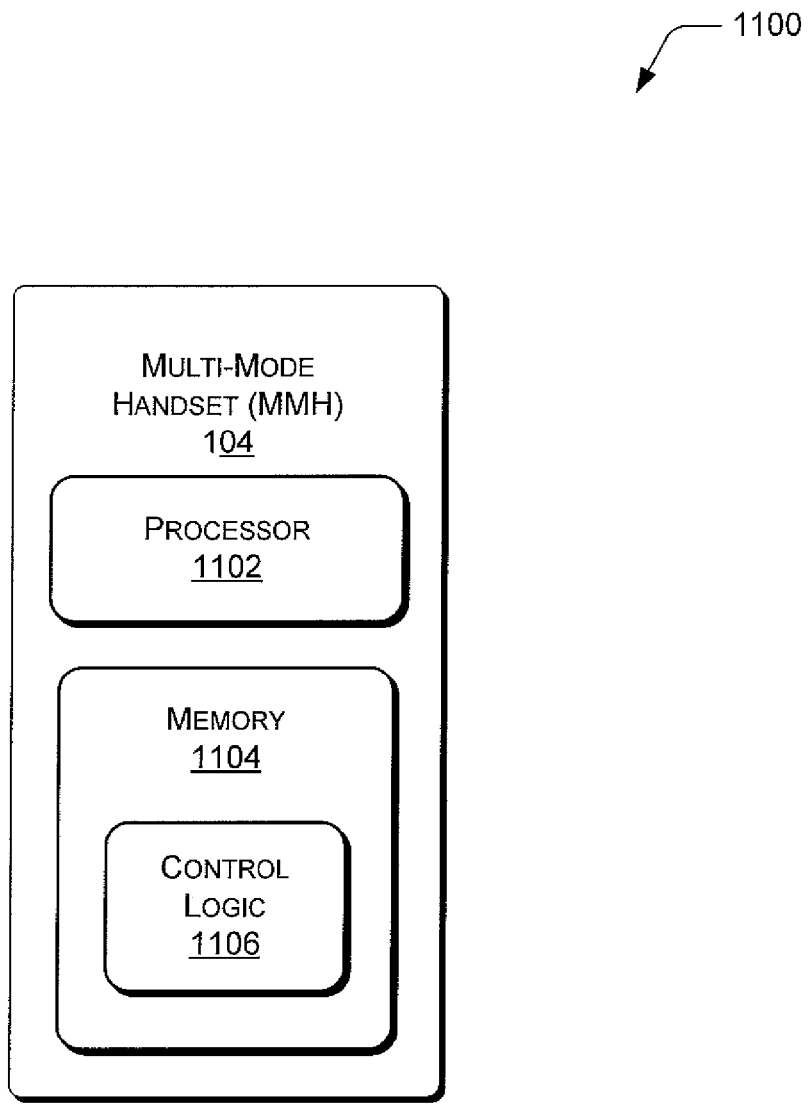
FIG. 11 is a block diagram of the multimode handset described herein.

FIG. 11 shows illustrative communication devices that may be implemented to provide seamless enterprise and consumer mobility. As described in FIG. 1 above, examples of such communication devices may include, but are not limited to multi-mode handsets (MMH) 104 in the form of a portable cellular phone 108, a portable laptop computer 110, and a personal digital assistant 112. These examples are provided for convenience of description only and not for limitation. These communication devices are capable of operating over both unlicensed and licensed spectrum. For example, these communication devices may operate over networks including but not limited to, WiFi networks, GSM/UMTS cellular networks, CDMA networks, and WiMAX networks.

The MMH 104 may connect to the VAS 606 through a data connection that supports, for example, an IP network. The Voice over IP (VoIP) and IP Telephony protocols may be used to carry information over the IP network. An advantage of VoIP is that incoming calls can be automatically routed to a VoIP telephone independent of the location and network to which the VoIP telephone is connected. Services utilizing VoIP may function on a WiFi SIP phone to extend services in, for example, a private, building-wide local area network. Wireless Fidelity (WiFi) is describes a technology for transmitting radio signals to and from an access point under the IEEE 802.11g wireless networking standard. An access point connects wireless communication devices to and/or from a wireless network, such as WiFi. A Session Initiation Protocol (SIP) is the IETF MMUSIC Working Group standard for accessing multimedia elements, such as voice, instant messaging, and the like. In addition, these services extend to off-site locations, where the WiFi SIP phones may connect to a WiFi network (access point) at suitable hotspots. Hotspots may be located in restaurants, train stations, airports, cafes, libraries, and other public places.

FIG. 11 also illustrates several functional components of the multi-mode handset 104. Illustrative components of the multi-mode handset 104 may include a processor 1102 and a memory 1104 that is directly addressable or indirectly accessible to the processor 1102. Memory 1104 may represent any type of primary or secondary storage, including a ROM (Read Only Memory), a RAM (Random Access Memory), any type of flash memory, a hard disk drive, any portable media drive, or the like.

Memory 1104 can store programs executed on the processor 1102 and data generated during their execution. It may store any number of programs, data objects, other data structures, including an operating system, one or more application programs, other program modules, and program data. Memory 1104 can also include various computer-readable storage media. It will be understood that volatile memory may include media such as random access memory (RAM), and non volatile memory may include read only memory (ROM). The multi-mode handset 104 may also include other removable/non-removable, volatile/non-volatile computer storage media such as a hard disk drive for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. The disk drives and their associated computer-readable media can provide non-volatile storage of computer readable instructions, data structures, program modules, and other data for the multi-mode handset 104.

The multi-mode handset 104 also includes a control logic 1106. The control logic 1106 may be implemented as appropriate in hardware, software, firmware, or combinations thereof. Software or firmware implementations of the control logic 1106 may include computer- or machine-executable instructions written in any suitable programming language.

The subject matter described above can be implemented in hardware, or software, or in both hardware and software. Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

The invention claimed is:

1. A method for managing network connections between a communications device and at least two networks having different types, the method comprising:
  receiving, at a first network interface module, a first device detection signal associated with a first one of the networks, wherein:
   the first network has a first type; and
   the first device detection signal is generated in response to the communications device coming into proximity to the first network;
  generating, at the first network interface module, a first presence signal associated with the first network, wherein the first presence signal varies in response to a condition of a first connection between the communications device and the first network;
  evaluating, at a network selection module in communication with the first network interface module, the first presence signal to assess whether the condition of the first connection permits an ongoing communication facilitated by the first network; and
  initiating, at the network selection module, a handover of the ongoing communication to a second network when the condition of the first connection does not permit the ongoing communication to continue using the first network, wherein the second network has a second type that is different than the first type.

2. The method of claim 1, further comprising receiving, at a second network interface module, a second device detection signal associated with the second network, wherein the second device detection signal is generated in response to the communications device coming into proximity of the second network.

3. The method of claim 1, further comprising generating, at the second network interface module, a second presence signal associated with the second network, wherein the second presence signal varies in response to a condition of a second connection between the communications device and the second network.

4. The method of claim 3, further comprising evaluating, at the network selection module, the second presence signal to assess whether the condition of the second connection permits the ongoing communication to use the second network.

5. The method of claim 4, wherein initiating, at the network selection module, the handover of the ongoing communication is performed in response to the network selection module evaluating the second presence signal and the first presence signal.

6. The method of claim 1, further comprising generating, at the network selection module, a selection signal that selects one of the first network and the second network for handling the ongoing communication.

7. The method of claim 6, wherein initiating, at the network selection module, the handover of the ongoing communication is performed in response to the selection signal.

8. The method of claim 1, wherein:
  the first network is a cellular communication network; and
  the second network is a WiFi network.

9. The method of claim 1, wherein:
  the first network is a circuit-switched communication network; and
  the second network is a packet-switched network.

10. A mobility management component comprising:
  a first network interface module for:
   receiving a first device detection signal associated with a first network, wherein: the first network has a first type; and the first device detection signal is generated in response to the communications device coming into proximity to the first network; and generating a first presence signal associated with the first network, wherein the first presence signal varies in response to a condition of a first connection between the communications device and the first network; and a network selection module for:

evaluating the first presence signal to assess whether the condition of the first connection permits an ongoing communication facilitate by the first network; and initiating a handover of the ongoing communication to a second network when the condition of the first connection does not permit the ongoing communication to continue using the first network, wherein the second network has a second type that is different than the first type.

11. The mobility management component of claim 10, wherein the first network interface module is for communicating with a circuit-switched network.

12. The mobility management component of claim 10, further comprising a second network interface module for:

receiving a second device detection signal indicating that the communications device is in proximity to the second network; and generating a second presence signal that varies in response to a condition of a second connection between the communications device and the second network.

13. The mobility management component of claim 12, wherein the network selection module is for initiating the handover of the ongoing communication from the first network to the second network in response to the second presence signal.

14. The mobility management component of claim 12, wherein the network selection module is for generating a selection signal based on evaluating the first presence signal and the second presence signal, wherein the selection signal selects one of the first network interface module and the second network interface module.

15. The mobility management component of claim 12, wherein the second network interface module is for communicating with a packet-switched network.

16. The mobility management component of claim 12, wherein:

the first network interface module is for communicating with a cellular communication network; and the second network interface module is for communicating with a WiFi communication network.

17. A computer-readable medium comprising computer-executable instructions that, when executed by a processor, perform the steps of a method, comprising:

receiving a first device detection signal associated with a first network, wherein: the first network has a first type; and the first device detection signal is generated in response to a communications device coming into proximity to the first network;

generating a first presence signal associated with the first network, wherein the first presence signal varies in response to a condition of a first connection between the communications device and the first network;

evaluating the first presence signal to assess whether the condition of the first connection permits an ongoing communication facilitated by the first network; and initiating a handover of the ongoing communication to a second network when the condition of the first connection does not permit the ongoing communication to continue using the first network, wherein the second network has a second type that is different than the first type.

18. The computer-readable medium of claim 17, further comprising instructions for receiving a second device detection signal associated with the second network, wherein the second device detection signal is generated in response to the communications device coming into proximity of the second network.

19. The computer-readable medium of claim 17, further comprising instructions for generating a selection signal that selects one of the first network and the second network for handling the ongoing communication.

* * * * *